United States Patent
Yong et al.

(10) Patent No.: US 10,387,973 B2
(45) Date of Patent: Aug. 20, 2019

(54) TRENDING STORIES IN GAME ACTIVITY FEEDS

(71) Applicants: SONY CORPORATION, Tokyo (JP); Sony Interactive Entertainment LLC, San Mateo, CA (US)

(72) Inventors: Stephen Yong, San Francisco, CA (US); Khoi-Nguyen Duc Do, San Jose, CA (US); Dustin Huy Pham, Concord, CA (US); Isaias Formacio-Serna, San Francisco, CA (US)

(73) Assignees: Sony Corporation, Tokyo (JP); Sony Interactive Entertainment LLC, San Mateo, CA (US)

( * ) Notice: Subject to any disclaimer, the term of this patent is extended or adjusted under 35 U.S.C. 154(b) by 178 days.

(21) Appl. No.: 14/192,588

(22) Filed: Feb. 27, 2014

(65) Prior Publication Data

US 2014/0243097 A1 Aug. 28, 2014

Related U.S. Application Data

(60) Provisional application No. 61/770,519, filed on Feb. 28, 2013, provisional application No. 61/904,093, filed on Nov. 14, 2013.

(51) Int. Cl.
| | |
|---|---|
| A61F 13/30 | (2006.01) |
| G06Q 50/00 | (2012.01) |
| G06Q 10/10 | (2012.01) |
| G06Q 30/02 | (2012.01) |
| A63F 13/86 | (2014.01) |
| A63F 13/87 | (2014.01) |
| A63F 13/795 | (2014.01) |

(52) U.S. Cl.
CPC .............. *G06Q 50/01* (2013.01); *G06Q 10/10* (2013.01); *G06Q 30/0209* (2013.01); *A63F 13/795* (2014.09); *A63F 13/86* (2014.09); *A63F 13/87* (2014.09)

(58) Field of Classification Search
CPC .......... A63F 13/12; A63F 13/50; A63F 13/86; A63F 13/87; G06Q 50/01; G06Q 30/02; G06Q 30/0201; G06Q 10/10
USPC ....................................... 463/35, 40, 42, 43
See application file for complete search history.

(56) References Cited

U.S. PATENT DOCUMENTS

2007/0214120 A1* 9/2007 Niendorff .............. G06Q 10/10
2007/0259716 A1* 11/2007 Mattice ................... G06F 3/013
463/36

(Continued)

*Primary Examiner* — Michael A Cuff
(74) *Attorney, Agent, or Firm* — Haverstock & Owens LLP

(57) ABSTRACT

Activity feeds let users know about what is happening, and stay connected, with their friends and games. Users are able to discover new and exciting stories, games and friends. The information presented for a particular user is the most relevant information for that user. Relevancy is used to determine the priority of how items/feed stories are presented for a user. Feed stories are shown for a particular user's friends. The most popular trending stories are shown to all users based on relevancy rules. Most popular trending stories are determined based on the ones that have the most comments and likes. The activity feeds relating to a particular type are able to be condensed and presented to the users. Custom actions for the particular type of condensed activity feeds are identical. Condensed activity feeds are displayed using a predefined format "condensed title."

34 Claims, 10 Drawing Sheets

(56) References Cited

U.S. PATENT DOCUMENTS

| | | | |
|---|---|---|---|
| 2008/0009345 A1* | 1/2008 | Bailey | G07F 17/32 463/29 |
| 2008/0176655 A1* | 7/2008 | James | G06F 19/3475 463/42 |
| 2008/0256234 A1* | 10/2008 | Sispoidis | G06Q 30/02 709/224 |
| 2009/0288118 A1* | 11/2009 | Chang | H04N 5/44543 725/46 |
| 2011/0016112 A1* | 1/2011 | Yu | G06F 16/583 707/723 |
| 2011/0201414 A1 | 8/2011 | Barclay | |
| 2012/0197874 A1* | 8/2012 | Zatkin | G06Q 30/0282 707/722 |
| 2013/0036133 A1* | 2/2013 | Hogan | G06Q 30/02 707/769 |
| 2013/0053142 A1* | 2/2013 | Kress | A63F 13/88 463/31 |
| 2013/0103493 A1* | 4/2013 | Gao | G06Q 10/10 705/14.46 |
| 2013/0198204 A1* | 8/2013 | Williams | G06F 17/30283 707/748 |
| 2013/0227384 A1* | 8/2013 | Good | H04L 67/10 715/205 |
| 2013/0303274 A1* | 11/2013 | Gadher | G07F 17/3237 463/29 |
| 2014/0171190 A1 | 6/2014 | Diard | |
| 2014/0207860 A1* | 7/2014 | Wang | H04L 65/403 709/204 |
| 2014/0324721 A1* | 10/2014 | Rennison | G06Q 50/2057 705/321 |
| 2015/0113549 A1* | 4/2015 | Wolf | H04N 21/2385 725/9 |

* cited by examiner

TRENDING STORIES IN GAME ACTIVITY FEEDS

CROSS-REFERENCE TO RELATED APPLICATION(S)

This application claims priority under 35 U.S.C. § 119(e) of the U.S. Provisional Patent Application Ser. No. 61/770,519, filed Feb. 28, 2013 and titled, "Activity Feed" and U.S. Provisional Patent Application Ser. No. 61/904,093, filed Nov. 14, 2013 and titled, "Game Activity Feeds Trending and Compressing Stories," which are both hereby incorporated by reference in their entireties for all purposes.

FIELD OF THE INVENTION

The present invention relates to the field of video gaming. More specifically, the present invention relates to activity feeds in video gaming.

BACKGROUND OF THE INVENTION

Game activity feeds let users know what is happening, and stay connected, with their friends and games. The feeds enable users to discover new and exciting stories, games and friends and deliver the information to a user. The feed can contain a large amount of activities that are happening around a user, some important and some not important.

SUMMARY OF THE INVENTION

Activity feeds let users know about what is happening, and stay connected, with their friends and games. Users are able to discover new and exciting stories, games and friends. The information presented for a particular user is the most relevant information for that user. Relevancy is used to determine the priority of how items/feed stories are presented for a user. Feed stories are shown for a particular user's friends. The most popular trending stories are shown to all users based on relevancy rules. Most popular trending stories are determined based on the ones that have the most comments and likes. The activity feeds relating to a particular type are able to be condensed and presented to the users. Custom actions for the particular type of condensed activity feeds are identical. Condensed activity feeds are displayed using a predefined format "condensed title."

In one aspect, a method programmed in a non-transitory memory of a device comprises receiving a plurality of activity feed stories from users while the users are participating in an activity and transmitting trending activity feed stories to all users participating in the activity based on relevancy criteria. The activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service. The games comprise gaming console games. Trending activity feed stories are determined based on comments and likes. An activity feed with the most comments and/or the most likes is a most popular trending activity feed. A subset of the plurality of activity feed stories is condensed and presented to a user. The relevancy criteria includes number of comments and number of likes. The relevancy criteria includes story type, source, user targets and title targets and story activity. The relevancy criteria includes a story type relevancy constant, a relationship relevancy, a title relevancy and a story activity. The relationship relevancy includes friends in common, story interaction, comment interaction, like interaction and title interaction. The title relevancy includes a title constant and title frequency. The story activity includes story comments and story likes. Each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, a method programmed in a non-transitory memory of a device comprises displaying a gaming environment, receiving only trending activity feed stories and displaying only the trending activity feed stories in the gaming environment. Trending activity feed stories are determined based on comments and likes. An activity feed with the most comments and/or the most likes is a most popular trending activity feed. The trending activity feed stories are filtered using relevancy criteria. The relevancy criteria includes number of comments and number of likes. The relevancy criteria includes story type, source, user targets and title targets and story activity. The relevancy criteria includes a story type relevancy constant, a relationship relevancy, a title relevancy and a story activity. The relationship relevancy includes friends in common, story interaction, comment interaction, like interaction and title interaction. The title relevancy includes a title constant and title frequency. The story activity includes story comments and story likes. Each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, an apparatus comprises a non-transitory memory for storing an application, the application for: receiving a plurality of activity feed stories while the users are participating in an activity and transmitting trending activity feed stories to all users participating in the activity based on relevancy criteria and a processing component coupled to the memory, the processing component configured for processing the application. The activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service. The games comprise gaming console games. Trending activity feed stories are determined based on comments and likes. An activity feed with the most comments and/or the most likes is a most popular trending activity feed.

In yet another aspect, a gaming console apparatus comprises a non-transitory memory for storing an application, the application for: displaying a gaming environment, receiving only trending activity feed stories and displaying only the trending activity feed stories in the gaming environment and a processing component coupled to the memory, the processing component configured for processing the application. Trending activity feed stories are determined based on comments and likes. An activity feed with the most comments and/or the most likes is a most popular trending activity feed.

DETAILED DESCRIPTION OF THE PREFERRED EMBODIMENT

Activity feeds or game activity feeds enable users to be informed of what is happening, and stay connected, with their friends and games. The activity feeds enable users to discover new and exciting stories, games and friends. The activity feeds contain text, images, videos, content/title information, users associated with a story, social networking information and/or any other information. A "title" is another name for a game, and "title information" or a "title identifier" is a unique identification for a game. The activity feeds deliver the most relevant information for a user. Since a feed is able to contain a large amount of activities that are happening around a user, relevancy is used to determine the priority of how items are presented to a user.

Figure 1:
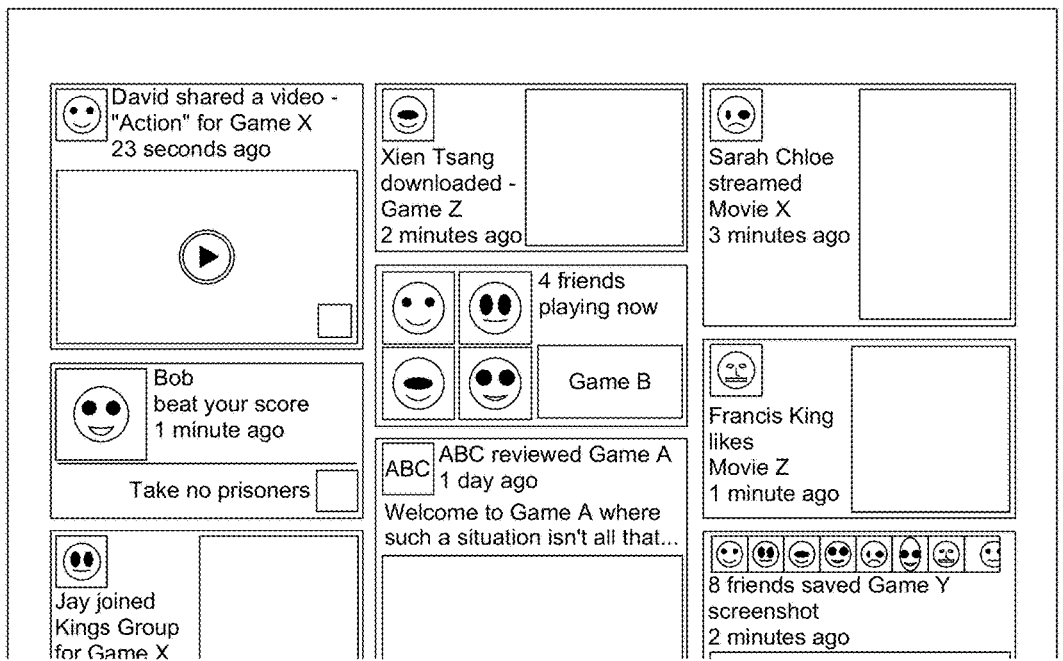
FIG. 1 shows an exemplary screenshot of how activity feed stories appear according to some embodiments.
Figure 2:
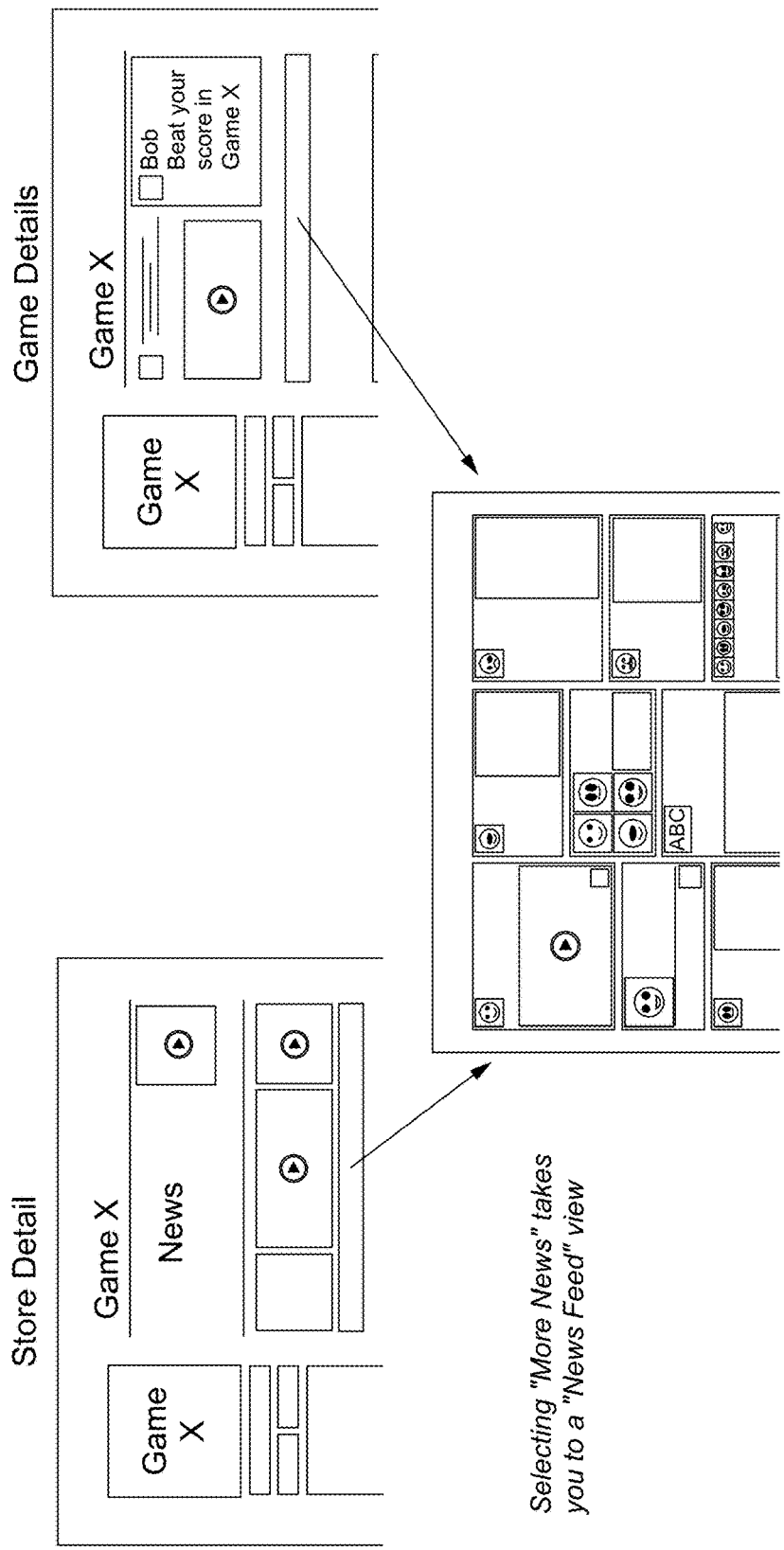
FIG. 2 shows exemplary screenshots of accessing a news feed according to some embodiments.
Figure 3:
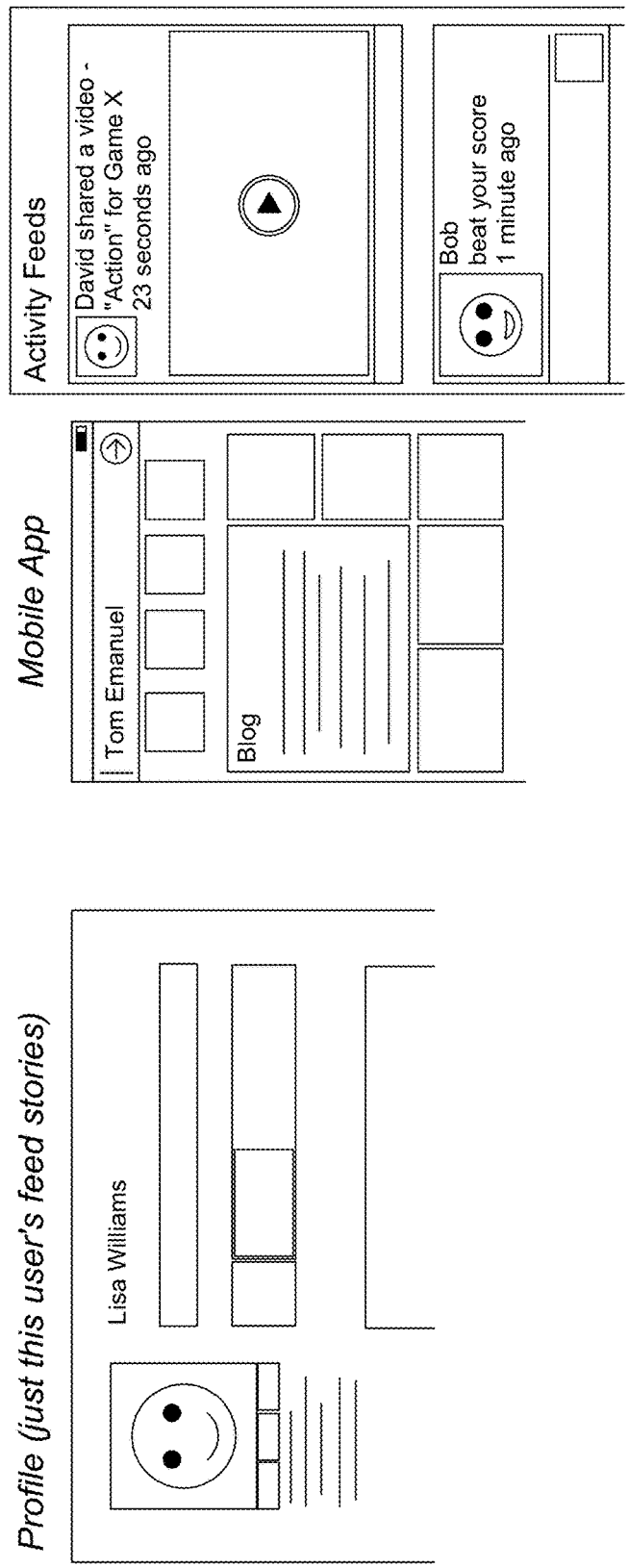
FIG. 3 shows exemplary screenshots of an activity feed on a user's profile page and an activity feed on a mobile application ("app") according to some embodiments.

FIG. 1 shows an exemplary screenshot of how activity feed stories appear according to some embodiments. In the example, FIG. 1 shows items such as the user's feed stories, feed stories from the user's friends, promotional stories from publishers and promotional stories from developers. Some examples shown in FIG. 1 include: a video being shared by a contact, another user being the current user's score, a user joining a group, purchase/download of a game by another user, a window of 4 friends playing a game (consolidated from listing the names of the 4 friends playing the game), a movie/game review, information about a user streaming a movie, a user liking a show and a window of 8 friends saving a screenshot (consolidated from listing the names of the 8 friends). FIG. 2 shows exemplary screenshots of accessing a news feed according to some embodiments. FIG. 3 shows exemplary screenshots of an activity feed on a user's profile page and an activity feed on a mobile app according to some embodiments.

There are many types of activity feeds such as in-game content/sharing, publisher/developer promotions, purchased content, video upload, screenshot upload, friending, liked piece of content, store promotion, social network post, watched a video, rating, trophy, profile picture, launched game first time, user played with these people, user played a game, user started broadcasting a stream and any other type of activity feed. Feed stories are able to be shown in-game.

Figure 4:
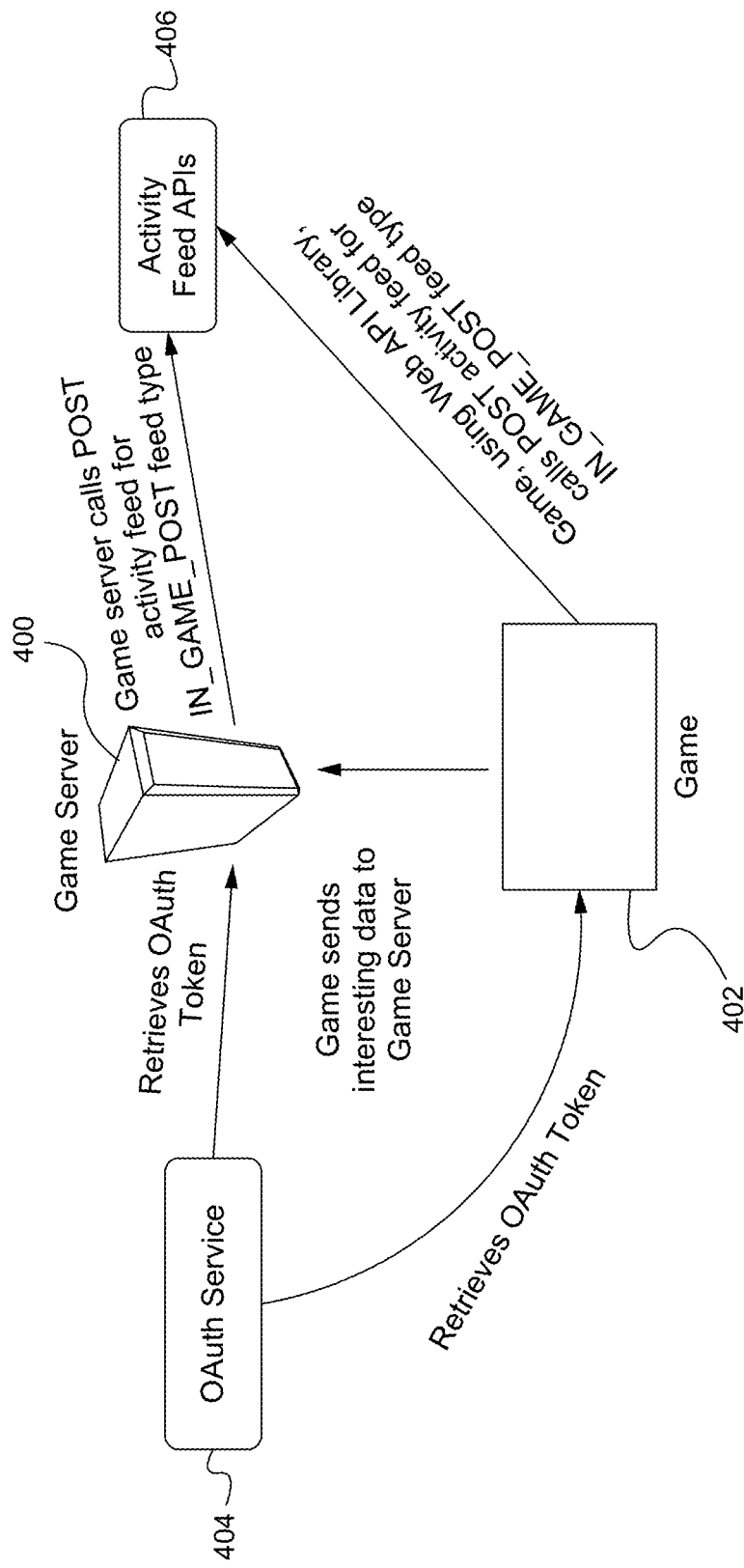
FIG. 4 illustrates a diagram of in-game activity data flow according to some embodiments.

FIG. 4 illustrates a diagram of in-game activity data flow according to some embodiments. A game server 400 retrieves an OAuth token from a gaming console network OAuth Service 404, and a game 402 retrieves an OAuth token from the gaming console network OAuth Service 404. The game 402 sends interesting data to the game server 400. The game server calls POST activity feed for IN_GAME_POST feed type. The game 402, using a Web API Library 406 calls POST activity feed for IN_GAME_POST feed type. Other implementations of presenting activity feeds are possible.

In some embodiments, stories are able to be condensed. IN_GAME_POST stories are rolled up for the title, based on the subType field. These will show up as a single condensed story in "Activity Feeds" or another area. A condensedTitles property is also able to be set to identify how the text shows up if the stories are condensed. An example of a condensed story is instead of displaying, Alvin played Video Game X, Bob played Video Game X and Candy played Video Game X, the display shows 3 friends played Video Game X.

An activity feed administration tool enables developers to add activity feed stories into their title's activity feed. The tool also enables developers to view an activity feed for their title, for a specific user. The tool also enables store operators the ability to globally administer take-downs and add store-specific activity feed items. Store promotions and publisher promotions are able to be managed as well. For example, a promotional item from store operators is able to be placed in a user's feed. In another example, a promotional item from a publisher is able to be placed in a user's feed.

Figure 5:
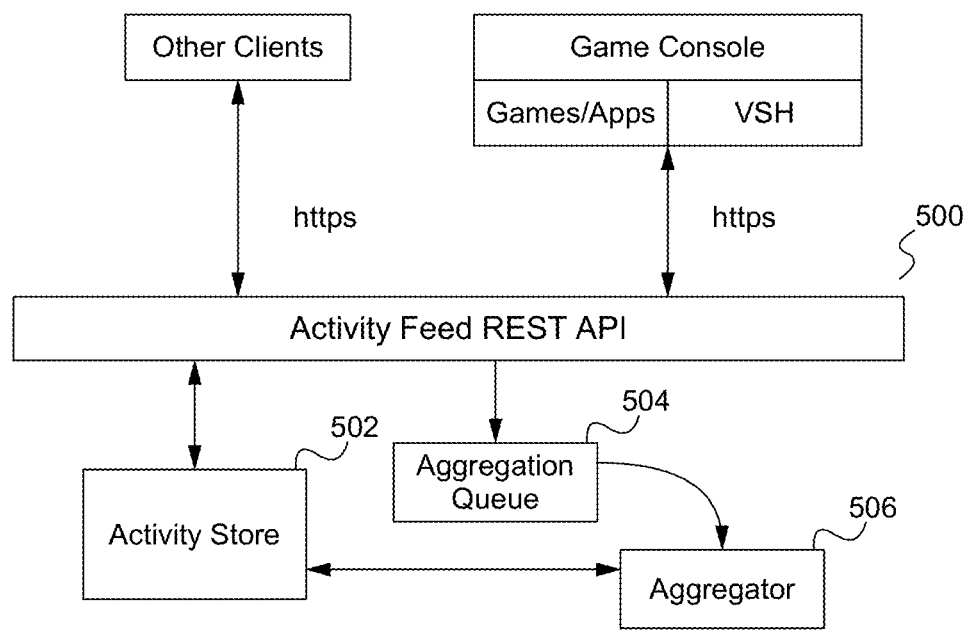
FIG. 5 illustrates a diagram of a system implementing an activity feed REST API according to some embodiments.

FIG. 5 illustrates a diagram of a system implementing an activity feed REpresentative State Transfer (REST) API according to some embodiments. The activity feed REST API 500 is used for submitting and retrieving activity feed data to and from an Activity Store 502. The API 500 submits aggregation requests into the aggregation queue. Additionally, filtering, parental controls, privacy and localization occur in the API 500. An aggregation queue 504 generates aggregation requests and initiates aggregations to the aggregator 506. The aggregator 506 generates activity feed blocks and calculates relevancy. The activity store 502 stores post data and aggregated feed blocks.

There are many commands to be used for processing/manipulating feeds. Some of the commands/functions enable: retrieving the activity feed for a title; retrieving the activity feed across all of a user's friends; retrieving the personal activity feed for a user; retrieving uploaded videos for a user; retrieving the uploaded screenshots for a user; retrieving the activity feed for the "played with" story type (users who recently played with in a match); retrieving the activity feed for the "broadcasting" story type (users who recently started broadcasting); retrieving the activity feed for the "watched videos" story type (users who recently started watching); submitting an activity feed story for a user; submitting a publisher promotion; submitting an activity feed story for a store promotion; resharing an activity feed story from someone else; submitting a comment and indicating that the user likes a story.

In some embodiments, the activity feeds are based on the title of the media (e.g., game). In some embodiments, an implementation is used to match games that have different titles based on translation or similar reasons. For example, if a video game has a title ID of "ABC" in the U.S. and has a title ID of "CDE" in Germany, an implementation (e.g., a look up table) is utilized to match the titles, and offer the same activity feed for both titles. For example, the system recognizes that Friend A is playing the US version of Video Game X and Friend B is playing the German version of Video Game X, and the activity is shown in their title feeds.

Figure 6:
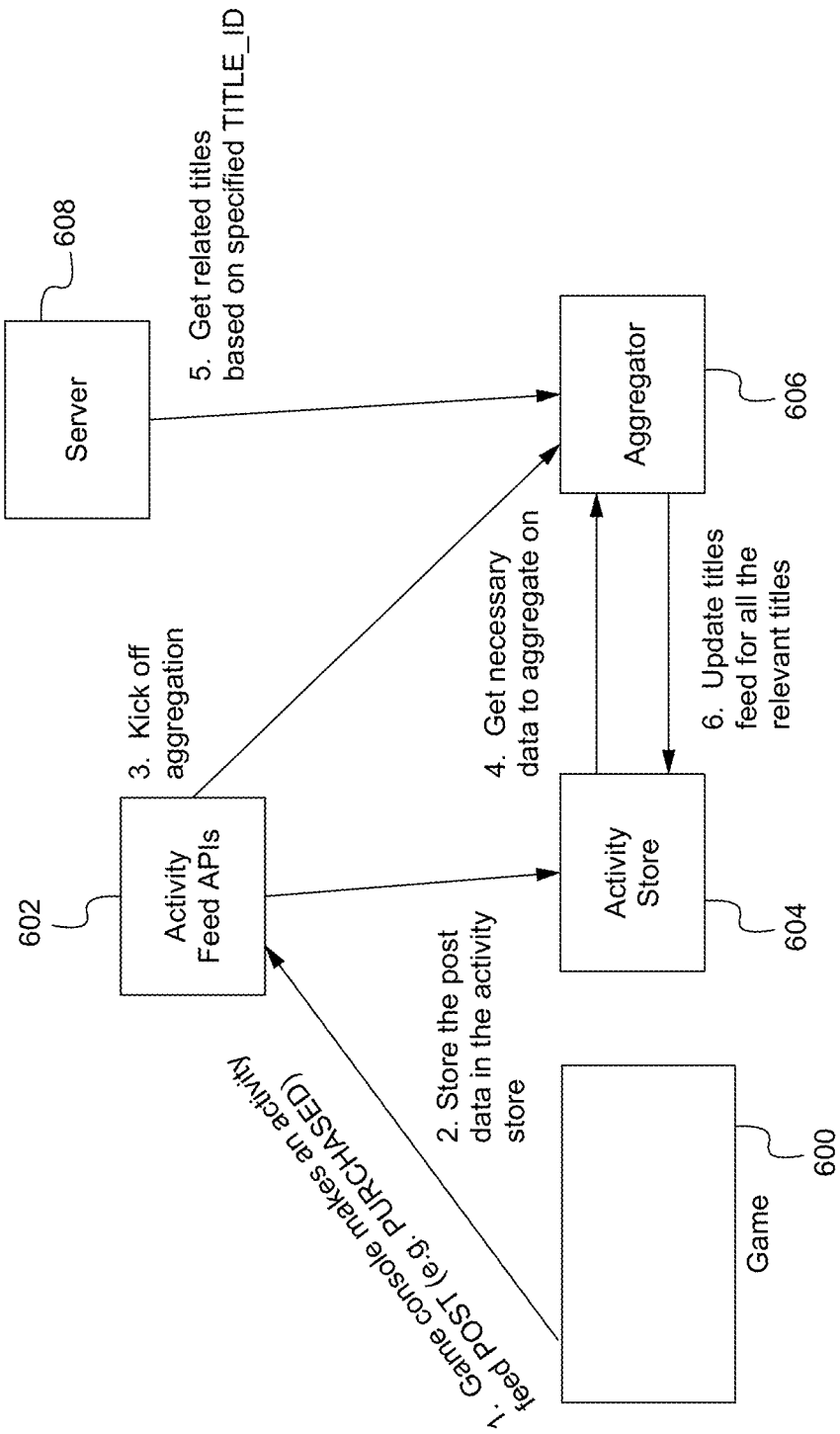
FIG. 6 illustrates a diagram of cross title analysis according to some embodiments.

FIG. 6 illustrates a diagram of cross title analysis according to some embodiments. A game 600 makes an activity feed POST. An activity feed API 602 starts aggregation. The post is stored in an activity store 604. An aggregator 606 receives the data to aggregate from the activity store 604. The aggregator 606 receives related titles based on the specified title identification/identifier from the server 608. The aggregator 606 updates the titles feed for all of the relevant titles.

Figure 7:
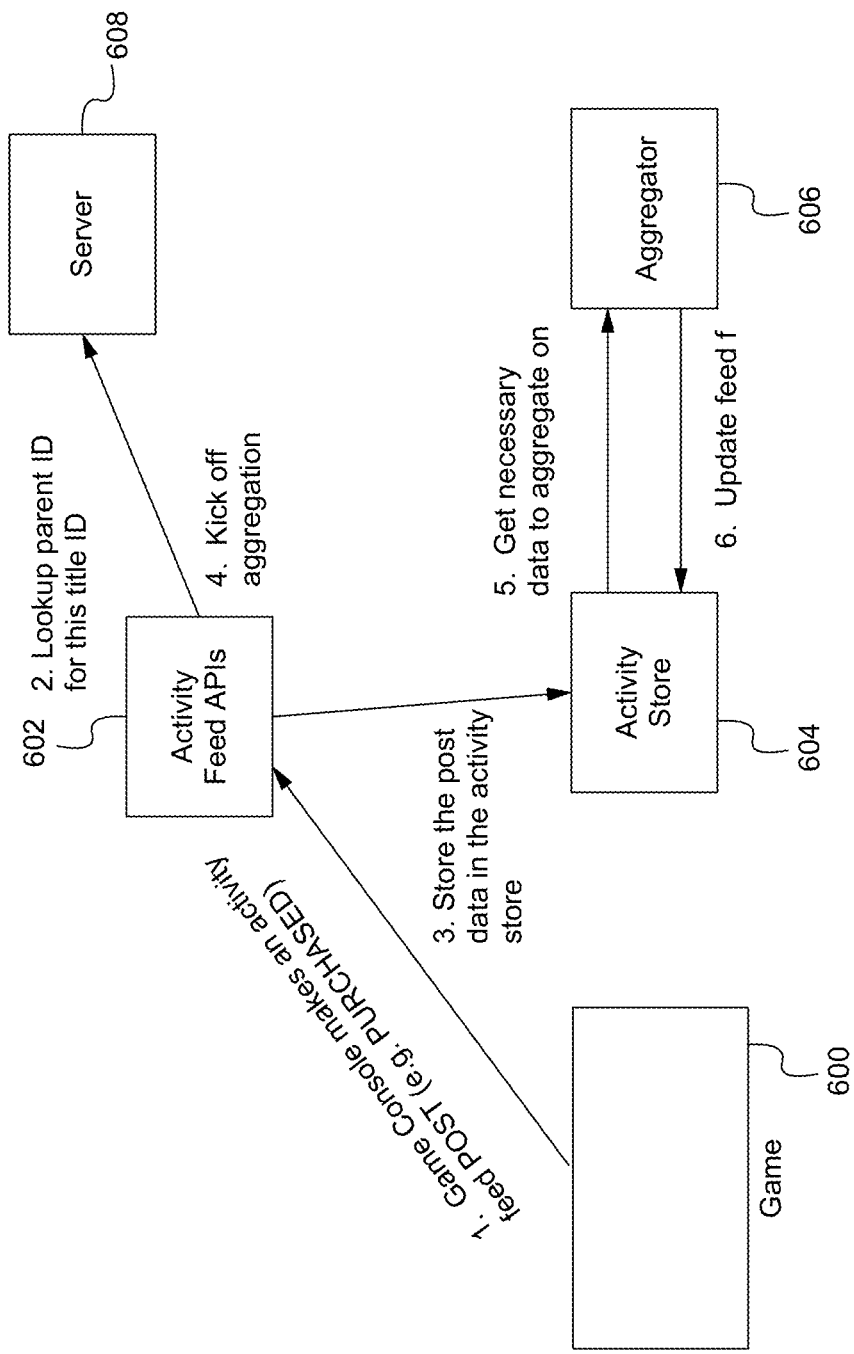
FIG. 7 illustrates a diagram of cross title analysis according to some embodiments.

FIG. 7 illustrates a diagram of cross title analysis according to some embodiments. A game 600 makes an activity feed POST. An activity feed API 602 looks up a parent identification for the title identification (e.g., using the server 608). The post is stored in an activity store 604. The activity feed API 602 starts aggregation. An aggregator 606 receives the data to aggregate from the activity store 604. The aggregator 606 receives related titles based on the specified title identifier from the server 608. The aggregator 606 updates the titles feed for all of the relevant titles.

In some embodiments, activity feeds are rate-limited based on the number of times the client has posted to the service within a time period.

In some embodiments, a privacy setting for feeds is able to be set. Exemplary privacy settings include: all, friends of friends, friends, and only me. Privacy settings are able to be applied to videos, trophies and other items.

In some embodiments, activity feed data is limited based on a user's age. For example, an 8 year old will not receive "mature" content in an activity feed.

In some embodiments, users receive activity feeds/stories based on relevancy of the feed to the user. Each story has several elements such as a source (user), story type and target (user(s) and target(s)).

A base formula for determining Story Relevancy is:

$$S=\text{Story Type}+\text{Source}+\text{Targets (Users and Titles)}+\text{Story Activity}$$

$$S_r=S_k+\Sigma(R_r+T_r)+S_a$$

$S_r$=Story relevancy
$S_k$=Story type relevancy constant
$R_r$=Relationship relevancy (source and targets)
$T_r$=Title relevancy
$S_a$=Story activity Relationship relevancy ($R_r$) is:

$$R_r=F_c+S_i+C_i+L_i+T_i$$

$F_c$=Friends in common
$S_i$=Story interaction
$C_i$=Comment interaction
$L_i$=Like interaction
$T_i$=Title interaction Title relevancy ($T_r$) is:

$$T_r=T_k+T_f$$

$T_k$=Title constant
$T_f$=Title frequency

Story activity ($S_a$) is:

$$S_a=S_c+S_l$$

$S_c$=Story comments
$S_l$=Story likes

All together:

$$S_r=S_k+\Sigma(F_c+S_i+C_i+L_i+T_i)+\Sigma(T_k+T_f)+S_c+S_l$$

Stories are evaluated only for live block (top block of stories). If a user is a source or target or the user liked/commented, then the story is automatically relevant. In some embodiments, stories are evaluated only when the count in the block exceeds the block size. When the number of relevant stories in the block is twice the size of the block ("n") size, the last "n" becomes "archived" (moved to a new block).

The story type relevancy constant is able to be any constant or a set of constants based on the story type. The relationship relevancy is based on the number of friends in common, whether the user or others have interacted with the story and how many times, whether the user or others have commented on the story and how many times, whether the user or others have "liked" the story and how many times and whether the user or others have interacted with the title and how many times. The title constant is able to be any constant based on the title. The title frequency is the number of times the title has been referenced, accessed and/or any other quality. The story comments are the number of comments a story has received, and the story likes are the number of likes a story has received.

In some embodiments, store promotions are maintained in a separate datastore. Operators are able to adjust the order of how these stories show up per region. The activity feed API retrieves the order of the stories from the store promotions datastore and intersperses them for all users in the newsfeed based on the order they are kept in the store promotions datastore.

When a user purchases content (e.g., game, downloadable content, app, video), the purchase information is published to the server. If the privacy settings allow others to see the purchase, the purchased feed will be displayed for other users. The information will be displayed on a "Game Details" view of the product, on the "Activity Feeds" page and the profile page of the user.

In some embodiments, video/screenshot sharing is implemented. The activity story informs a user that a friend shared a game play video or screenshot. The information is published to the server when the user posts the video/screenshot. The information will be displayed on a "Game Details" view of the product, on the "Activity Feeds" page and the profile page of the user. In some embodiments, the video/screenshot sharing shares the content on other social networking sites or other video sharing sites.

Additional activity stories include: played a game, which describes how many and/or which friends played a game and when; watched a video on a video sharing site (or other source), which describes which friends watched a video (including which video) and when; unlocked a trophy, which describes who unlocked which trophy; in-game activity, which describes who joins a group, beats a score, or performs another task/event in a game; broadcasting started, which describes when a friend starts broadcasting; liked content, which describes who "like" what content; 5-star rating, which describes when a friend provides a rating of content; profile picture update, which informs a user when a friend updates a profile picture (e.g., avatar); friending, which describes a friend becoming friends with someone else; publisher promotion which includes a promotion by a publisher (e.g., an advertisement for an upcoming tournament or a new game to purchase); promotion; recently played with, which describes who a user played with in a match, tournament or other game. These activity stories are sent to the server at the appropriate times, such as after a video is watched or when the trophy is unlocked.

Figure 8:
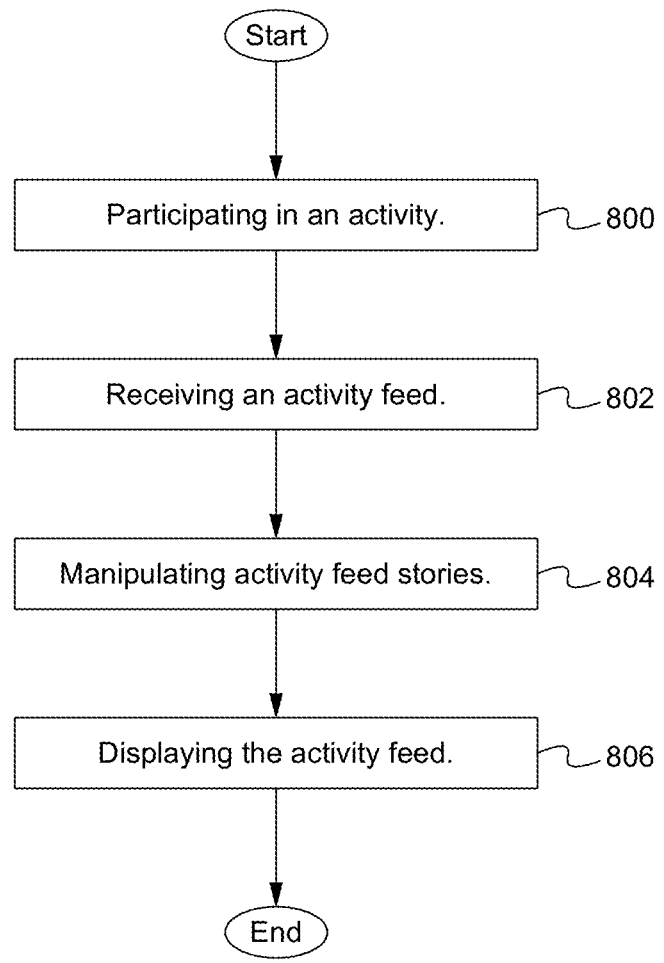
FIG. 8 illustrates a flowchart of a method of presenting an activity feed according to some embodiments.

FIG. 8 illustrates a flowchart of a method of presenting an activity feed according to some embodiments. In the step 800, a user participates in an activity (e.g., plays a video game on a gaming console). Other activities include: purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game and subscribing to a service. In the step 802, the game/game console receives an activity feed which includes activity feed stories. As described herein, the activity feed stories are able to include a variety of items such as screen shots, video clips, text and/or many other items. The activity feed stories are able to be from other users, friends of the user, advertisers, developers and/or any other entity. In some embodiments, the activity feed stories are manipulated in the step 804. For example, the activity feed stories are consolidated into a single story to save on display space. In another example, the activity feed stories are analyzed for relevancy, and only relevant stories are displayed for the user. In another example, activity feeds are condensed and/or displayed based on the particular type of feed. In the step 806, the activity feed is displayed (e.g., on the user's television or handheld display). For example, a screenshot from a friend is displayed for a user. In some embodiments, fewer or additional steps are implemented.

Figure 9:
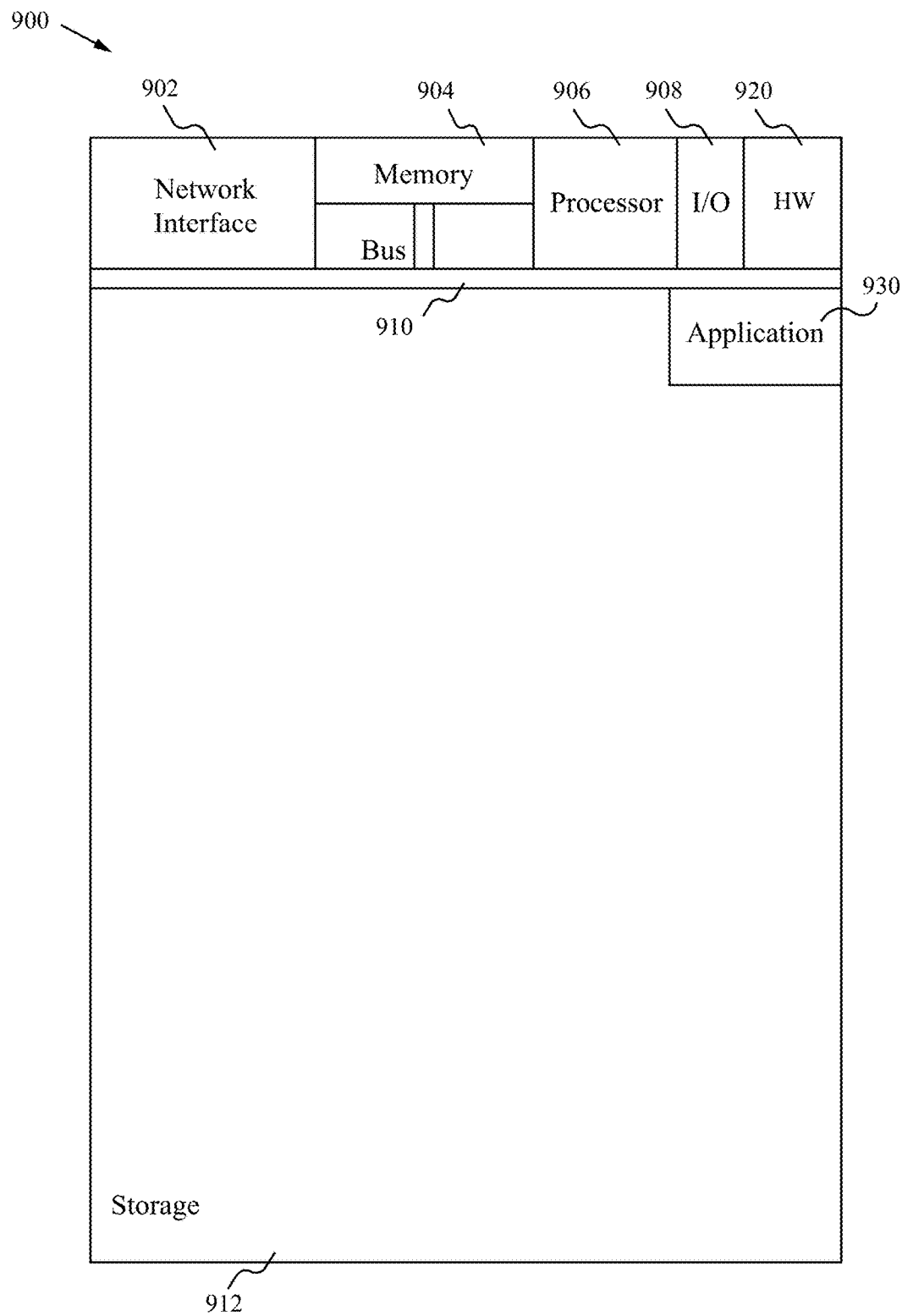
FIG. 9 illustrates a block diagram of an exemplary computing device configured to implement the activity feeds method according to some embodiments.

FIG. 9 illustrates a block diagram of an exemplary computing device configured to implement the activity feeds method according to some embodiments. The computing device 900 is able to be used to acquire, store, compute, process, communicate and/or display information such as games, text, images and videos. In general, a hardware structure suitable for implementing the computing device 900 includes a network interface 902, a memory 904, a processor 906, I/O device(s) 908, a bus 910 and a storage device 912. The choice of processor is not critical as long as a suitable processor with sufficient speed is chosen. The memory 904 is able to be any conventional computer memory known in the art. The storage device 912 is able to include a hard drive, CDROM, CDRW, DVD, DVDRW, HD disc/drive, ultra-HD drive, flash memory card or any other storage device. The computing device 900 is able to include one or more network interfaces 902. An example of a network interface includes a network card connected to an Ethernet or other type of LAN. The I/O device(s) 908 are able to include one or more of the following: keyboard, mouse, monitor, screen, printer, modem, touchscreen, button interface and other devices. Activity feed application(s) 930 used to perform the activity feed method are likely to be stored in the storage device 912 and memory 904 and processed as applications are typically processed. More or fewer components shown in FIG. 9 are able to be included in the computing device 900. In some embodiments, activity feed hardware 920 is included. Although the computing device 900 in FIG. 9 includes applications 930 and hardware 920 for the activity feed method, the activity feed method is able to be implemented on a computing device in hardware, firmware, software or any combination thereof. For example, in some embodiments, the activity feed applications 930 are programmed in a memory and executed using a processor. In another example, in some embodiments, the activity feed hardware 920 is programmed hardware logic including gates specifically designed to implement the activity feed method.

In some embodiments, the activity feed application(s) 930 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 10:
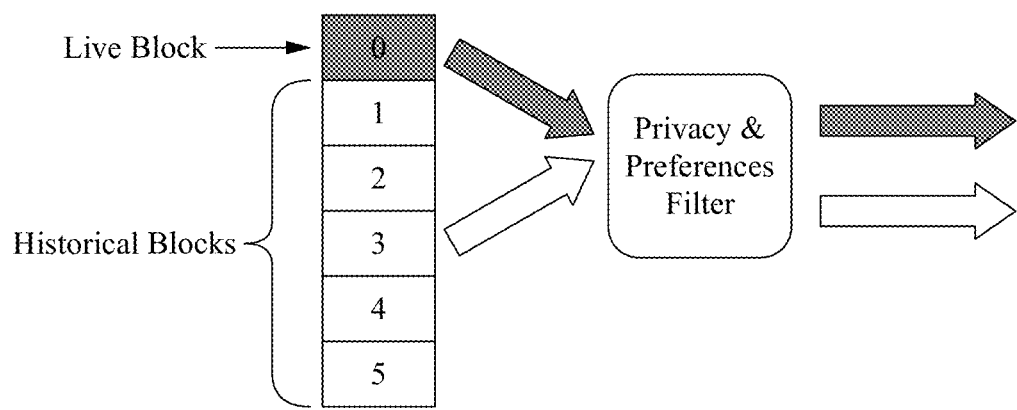
FIG. 10 illustrates a diagram of utilizing a block storage mechanism for storing stories according to some embodiments.

FIG. 10 illustrates a diagram of utilizing a block storage mechanism for storing stories according to some embodiments. A live block, or block 0, contains the most current story aggregations. The aggregator operates on the live block. The historical blocks, or blocks 1-5, contain archived story aggregations. Clients are able to simulate paging by requesting older blocks. Each block contains a finite number of activity stories. For each block, relevancy algorithms are applied on only the current block. The blocks are computed for the newsfeed for each user. The aggregations are filtered based on privacy and preferences. The filtering is performed in real-time.

To utilize activity feeds, users participate in an activity such as gaming, and relevant activity feeds are presented to the user during the activity. Users are able to interact using the activity feeds such as by sending content to other users as well as receive content from other users. Additionally, users are able to manually modify the type of content received/sent in activity feeds and other qualities of the activity feeds such as by changing privacy settings. In some embodiments, the qualities of the activity feeds are modified automatically based on analysis of user actions and/or other characteristics of the user.

In operation, activity feeds let users know about what is happening, and stay connected, with their friends and games. Users are able to discover new and exciting stories, games and friends. Activity feeds have feed stories that contain text, images, videos, content/title information and users associated with the respective feed stories. The information presented for a particular user is the most relevant information for that user. Relevancy is used to determine the priority of how items/feed stories are presented for a user. Feed stories are shown for a particular user's friends. The most popular trending stories are shown to all users based on relevancy rules. Most popular trending stories are determined based on the ones that have the most comments and likes.

The activity feeds relating to a particular type (e.g., the same game) are able to be condensed and presented to the users. In some embodiments, custom actions for the particular type of condensed activity feeds are identical. In some embodiments, condensed activity feeds are displayed using a predefined format "condensed title."

Some Embodiments of Trending Stories in Game Activity Feeds

1. A method programmed in a non-transitory memory of a device comprising:
   a. receiving a plurality of activity feed stories from users while the users are participating in an activity; and
   b. transmitting trending activity feed stories to all users participating in the activity based on relevancy criteria.
2. The method of clause 1 wherein the activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service.
3. The method of clause 2 wherein the games comprise gaming console games.
4. The method of clause 1 wherein trending activity feed stories are determined based on comments and likes.
5. The method of clause 4 wherein an activity feed with the most comments and/or the most likes is a most popular trending activity feed.
6. The method of clause 1 wherein a subset of the plurality of activity feed stories is condensed and presented to a user.
7. The method of clause 1 wherein the relevancy criteria includes number of comments and number of likes.
8. The method of clause 1 wherein the relevancy criteria includes story type, source, user targets and title targets and story activity.
9. The method of clause 1 wherein the relevancy criteria includes a story type relevancy constant, a relationship relevancy, a title relevancy and a story activity.
10. The method of clause 9 wherein the relationship relevancy includes friends in common, story interaction, comment interaction, like interaction and title interaction.
11. The method of clause 9 wherein the title relevancy includes a title constant and title frequency.
12. The method of clause 9 wherein the story activity includes story comments and story likes.
13. The method of clause 1 wherein each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream.
14. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
15. A method programmed in a non-transitory memory of a device comprising:
   a. displaying a gaming environment;
   b. receiving only trending activity feed stories; and
   c. displaying only the trending activity feed stories in the gaming environment.
16. The method of clause 15 wherein trending activity feed stories are determined based on comments and likes.
17. The method of clause 16 wherein an activity feed with the most comments and/or the most likes is a most popular trending activity feed.
18. The method of clause 15 wherein the trending activity feed stories are filtered using relevancy criteria.
19. The method of clause 18 wherein the relevancy criteria includes number of comments and number of likes.
20. The method of clause 18 wherein the relevancy criteria includes story type, source, user targets and title targets and story activity.
21. The method of clause 18 wherein the relevancy criteria includes a story type relevancy constant, a relationship relevancy, a title relevancy and a story activity.
22. The method of clause 21 wherein the relationship relevancy includes friends in common, story interaction, comment interaction, like interaction and title interaction.
23. The method of clause 21 wherein the title relevancy includes a title constant and title frequency.
24. The method of clause 21 wherein the story activity includes story comments and story likes.
25. The method of clause 15 wherein each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream.
26. The method of clause 15 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
27. An apparatus comprising:
   a. a non-transitory memory for storing an application, the application for:
      i. receiving a plurality of activity feed stories while the users are participating in an activity; and ii. transmitting trending activity feed stories to all users participating in the activity based on relevancy criteria; and
b. a processing component coupled to the memory, the processing component configured for processing the application.
28. The apparatus of clause 27 wherein the activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service.
29. The apparatus of clause 28 wherein the games comprise gaming console games.
30. The apparatus of clause 27 wherein trending activity feed stories are determined based on comments and likes.
31. The apparatus of clause 30 wherein an activity feed with the most comments and/or the most likes is a most popular trending activity feed.
32. A gaming console apparatus comprising:
a. a non-transitory memory for storing an application, the application for:
i. displaying a gaming environment;
ii. receiving only trending activity feed stories; and
iii. displaying only the trending activity feed stories in the gaming environment; and
b. a processing component coupled to the memory, the processing component configured for processing the application.
33. The gaming console apparatus of clause 32 wherein trending activity feed stories are determined based on comments and likes.
34. The gaming console apparatus of clause 33 wherein an activity feed with the most comments and/or the most likes is a most popular trending activity feed.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a server device comprising:
a. receiving, at the server device, a plurality of activity feed stories from user devices while the users are participating in an activity,
wherein the activity feed stories are based on a title of a game,
further wherein a lookup table is utilized by the server device to match the title of the game with one or more translated titles of the game,
wherein the server device filters activity feed stories in real time,
wherein an aggregation queue is utilized by the server device to request and aggregate the activity feed stories; and
b. transmitting trending activity feed stories to all users participating in the activity based on relevancy criteria.

2. The method of claim 1 wherein the activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service.
3. The method of claim 2 wherein the games comprise gaming console games.
4. The method of claim 1 wherein trending activity feed stories are determined based on comments and likes.
5. The method of claim 4 wherein an activity feed with the most comments and/or the most likes is a most popular trending activity feed.
6. The method of claim 1 wherein a subset of the plurality of activity feed stories is condensed and presented to a user.
7. The method of claim 1 wherein the relevancy criteria includes number of comments and number of likes.
8. The method of claim 1 wherein the relevancy criteria includes story type, source, user targets and title targets and story activity.
9. The method of claim 1 wherein the relevancy criteria includes a story type relevancy constant, a relationship relevancy, a title relevancy and a story activity.
10. The method of claim 9 wherein the relationship relevancy includes friends in common, story interaction, comment interaction, like interaction and title interaction.
11. The method of claim 9 wherein the title relevancy includes a title constant and title frequency.
12. The method of claim 9 wherein the story activity includes story comments and story likes.
13. The method of claim 1 wherein each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream.
14. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
15. A method programmed in a non-transitory memory of a user device comprising:
a. displaying a gaming environment on the user device;
b. receiving, on the user device over a network, only trending activity feed stories from a gaming console network service implemented on a server device,
wherein the trending activity feed stories are based on a title of a game, further wherein a lookup table is utilized by the server device to match the title of the game with one or more translated titles of the game,
wherein the server device filters activity feed stories in real time, wherein an aggregation queue is utilized by the server device to request and aggregate the trending activity feed stories; and c. displaying, on the user device, only the trending activity feed stories in the gaming environment.

16. The method of claim 15 wherein trending activity feed stories are determined based on comments and likes.

17. The method of claim 16 wherein an activity feed with the most comments and/or the most likes is a most popular trending activity feed.

18. The method of claim 15 wherein the trending activity feed stories are filtered using relevancy criteria.

19. The method of claim 18 wherein the relevancy criteria includes number of comments and number of likes.

20. The method of claim 18 wherein the relevancy criteria includes story type, source, user targets and title targets and story activity.

21. The method of claim 18 wherein the relevancy criteria includes a story type relevancy constant, a relationship relevancy, a title relevancy and a story activity.

22. The method of claim 21 wherein the relationship relevancy includes friends in common, story interaction, comment interaction, like interaction and title interaction.

23. The method of claim 21 wherein the title relevancy includes a title constant and title frequency.

24. The method of claim 21 wherein the story activity includes story comments and story likes.

25. The method of claim 15 wherein each activity feed story of the plurality of activity feed stories comprises at least one of in-game content/sharing, publisher/developer promotions, purchased content, video upload, screenshot upload, friending, liked piece of content, store promotion, social network post, watched a video, rating, trophy, profile picture, launched game first time, user played with these people, user played a game and user started broadcasting a stream.

26. The method of claim 15 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

27. An apparatus comprising:
a. a non-transitory memory for storing an application, the application for:
 i. receiving a plurality of activity feed stories from user devices while users are participating in an activity, wherein the activity feed stories are based on a title of a game, further
  wherein a lookup table is utilized by the apparatus to match the title of the game with one or more translated titles of the game,
  wherein the server device filters activity feed stories in real time,
  wherein an activity feed application programming interface and an aggregation queue are utilized by the apparatus to request and aggregate the activity feed stories, further wherein the activity feed application programming interface enables filtering, parental controls and privacy;
 ii. condensing, at the apparatus, stories based on a sub-type field, including using a condensed titles property to identify how stories appear when condensed; and
 iii. transmitting trending activity feed stories to all user devices participating in the activity based on relevancy criteria; and
b. a processing component coupled to the memory, the processing component configured for processing the application.

28. The apparatus of claim 27 wherein the activity comprises playing games; purchasing a piece of content from a store; uploading a video or a screenshot, a generic post from in-game; becoming friends with someone else; liking a product in the store; a promotional item; watching a video from a service; rating a game; receiving a trophy from a particular game; a profile picture being changed; playing with people; broadcasting a game or subscribing to a service.

29. The apparatus of claim 28 wherein the games comprise gaming console games.

30. The apparatus of claim 27 wherein trending activity feed stories are determined based on comments and likes.

31. The apparatus of claim 30 wherein an activity feed with the most comments and/or the most likes is a most popular trending activity feed.

32. A gaming console apparatus comprising:
a. a non-transitory memory for storing an application, the application for:
 i. displaying a gaming environment;
 ii. receiving only trending activity feed stories by retrieving a token from a gaming console network service implemented on a server device, wherein the trending activity feed stories are based on a title of a game, further wherein a lookup table is utilized by the server device to match the title of the game with one or more translated titles of the game, wherein the server device filters activity feed stories in real time, wherein an aggregation queue is utilized by the server device to request and aggregate the trending activity feed stories; and
 iii. displaying only the trending activity feed stories in the gaming environment; and
b. a processing component coupled to the memory, the processing component configured for processing the application.

33. The gaming console apparatus of claim 32 wherein trending activity feed stories are determined based on comments and likes.

34. The gaming console apparatus of claim 33 wherein an activity feed with the most comments and/or the most likes is a most popular trending activity feed.

* * * * *